(12) United States Patent
Fabris et al.

(10) Patent No.: US 7,109,719 B2
(45) Date of Patent: Sep. 19, 2006

(54) METHOD AND APPARATUS FOR AZIMUTHAL RESISTIVITY MEASUREMENTS IN A BOREHOLE

(75) Inventors: Antonio Fabris, Houston, TX (US); Rashid Khokhar, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/842,828

(22) Filed: May 11, 2004

(65) Prior Publication Data

US 2005/0253589 A1 Nov. 17, 2005

(51) Int. Cl.
*G01V 3/18* (2006.01)
*G01V 3/26* (2006.01)

(52) U.S. Cl. .................. 324/367; 324/373; 324/374; 324/375

(58) Field of Classification Search ................ 324/367, 324/366, 373, 374, 375, 371
See application file for complete search history.

(56) References Cited

U.S. PATENT DOCUMENTS

| | | | | |
|---|---|---|---|---|
| 3,075,142 A | * | 1/1963 | Albright et al. | 324/375 |
| 3,262,050 A | * | 7/1966 | Threadgold et al. | 324/375 |
| 3,772,589 A | | 11/1973 | Scholberg | 324/10 |
| 4,468,623 A | * | 8/1984 | Gianzero et al. | 324/367 |
| 4,697,150 A | * | 9/1987 | Marquis | 324/373 |
| 5,036,283 A | * | 7/1991 | Trouiller et al. | 324/375 |
| 5,049,822 A | * | 9/1991 | Zoltan et al. | 324/367 |
| 5,162,740 A | * | 11/1992 | Jewell | 324/347 |
| 5,396,175 A | * | 3/1995 | Seeman | 324/375 |
| 5,399,971 A | | 3/1995 | Seeman et al. | 324/373 |
| 6,025,722 A | * | 2/2000 | Evans et al. | 324/373 |
| 6,060,885 A | * | 5/2000 | Tabarovsky et al. | 324/366 |
| 6,348,796 B1 | | 2/2002 | Evans et al. | 324/374 |
| 6,801,039 B1 | * | 10/2004 | Fabris et al. | 324/324 |
| 2002/0153897 A1 | | 10/2002 | Evans et al. | 324/374 |
| 2003/0155925 A1 | | 8/2003 | Tabarovsky et al. | 324/374 |
| 2003/0164705 A1 | | 9/2003 | Cheung et al. | 324/374 |
| 2003/0164706 A1 | | 9/2003 | Iwanicki et al. | 324/375 |
| 2003/0173968 A1 | | 9/2003 | Cheung et al. | 324/374 |
| 2004/0051531 A1 | | 3/2004 | Chernali et al. | 324/367 |

FOREIGN PATENT DOCUMENTS

FR 2611920 A1 9/1988
GB 928583 6/1963

OTHER PUBLICATIONS

J.W. Smits et al.; *High Resolution From a New Laterolog With Azimuthal Imaging*, SPE 30584, 1995 SPE Annual Technical Conference and Exhibition, Oct. 22-25, 1995, pp. 563-576, 14 Figs.

* cited by examiner

*Primary Examiner*—Jay M. Patidar
(74) *Attorney, Agent, or Firm*—Madan, Mossman & Sriram, P.C.

(57) ABSTRACT

An azimuthal resistivity logging tool includes one or more pads for making azimuthal resistivity measurements of earth formation. Current from the pads, guard electrodes and a measure electrode are measured while monitoring the voltage difference between pairs of monitor electrodes. The pads and an adjacent portion of the tool body form a guard electrode. In addition, microelectrodes are provided on the pads for obtaining high resolution resistivity measurements.

26 Claims, 6 Drawing Sheets

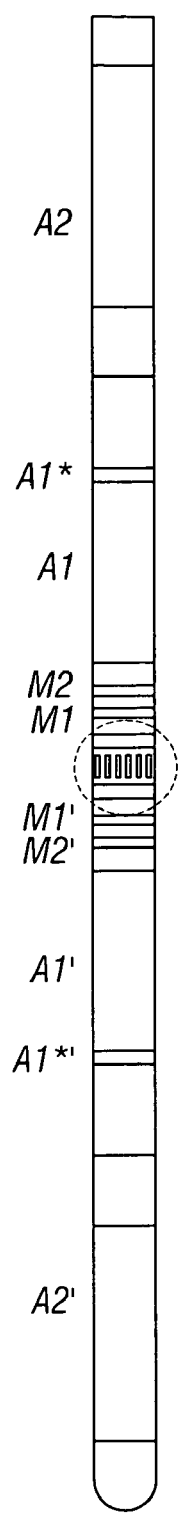
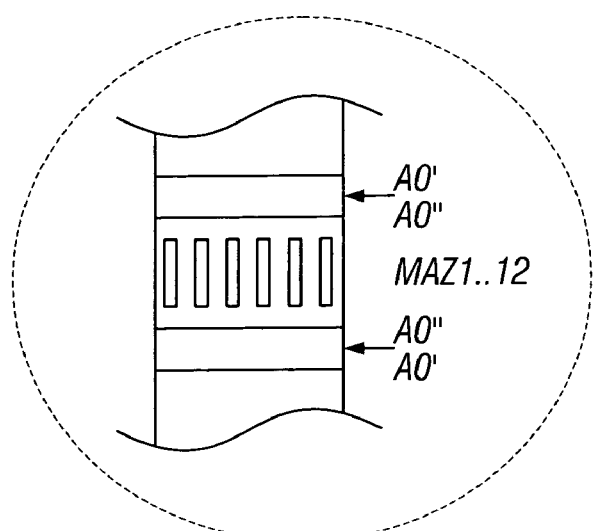
FIG. 4B
(Prior Art)
FIG. 4A
(Prior Art)

METHOD AND APPARATUS FOR AZIMUTHAL RESISTIVITY MEASUREMENTS IN A BOREHOLE

BACKGROUND OF THE INVENTION

1. Field of the Invention

The invention is related generally to the field of interpretation of measurements made by well logging resistivity instruments for the purpose of determining the properties of earth formations. More specifically, the invention is related to an apparatus and method for determination of the electrical resistivity of an earth formation when there is an azimuthal variation in the resistivity.

2. Background of the Art

A well logging device with electrodes that has been commercially available for many years and that is known under the name "Dual Laterolog" is described in U.S. Pat. No. 3,772,589 to Scholberg. That device comprises an array of annular electrodes used for sending electrical measurement currents into the formations for the purpose of measuring their resistivity. The measurement currents are focused in an annular zone having the form of a disk perpendicular to the borehole axis by means of auxiliary currents emitted by guard electrodes. That device includes measuring deep resistivity of the earth formations and measuring shallower resistivity of the earth formations by emitting currents at different frequencies, typically 35 Hz and 280 Hz.

A drawback of the Scholberg device is that its longitudinal resolution is poor, being about one meter. In addition, it does not have azimuthal sensitivity. Azimuthal variations of resistivity can occur in boreholes that are deviated or horizontal. When this happens, the annular zone scanned by the device around the borehole comprises different layers of earth formation and gives an average measurement that has little meaning. In addition, it is well known that by the time wireline logging devices are run in a borehole, there may be invasion of the earth formations by drilling mud from the borehole. This results in an invaded zone in which the resistivity is different from that of the uninvaded earth formations. When there is an azimuthal variation in the depth of the invaded zone, there will be azimuthal variations in resistivity. It is therefore desirable to obtain resistivity measurements in a plurality of azimuthal directions around the borehole.

British patent GB 928 583 to Threadgold et al. discloses an array of azimuthal measurement electrodes distributed circumferentially around the periphery of a logging sonde. A guard electrode which surrounds the measurement electrodes enables an auxiliary current to be emitted for focusing the currents emitted by each of the measurement electrodes. In such a sonde, measurement current focusing is passive, and this focusing is obtained by emitting the various currents via electrodes that are short-circuited together. This suffers from the drawback that the focusing is not particularly effective. In addition, the Threadgold device also has poor longitudinal resolution.

French patent FR 2 611 920 to Mosnier describes a logging sonde in which correction means are proposed acting on the potential of the current electrodes in order to improve focusing. The sonde includes monitor electrodes disposed at a certain distance ahead of the current electrodes and circuits that are responsive to the potentials detected by said monitor electrodes to control the measurement currents. It is difficult and complicated to make such a sonde, which requires concentric rings of electrodes.

U.S. Pat. No. 5,399,971 to Seeman et al. attempts to address the drawbacks with the Threadgold and Mosnier devices by a modification of the basic laterolog configuration. A modification of the Seeman device is disclosed in Smits et al., (SPE paper 30584) and illustrated schematically in FIGS. 4a and 4b. The overall electrode arrangement resembles that of the Dual Laterolog. The electrodes AO, A1 and A2 with their symmetric counterparts AO', A1' and A2' serve to emit current into the formation, while monitoring electrodes M1, M2 and A1* along with M1', M2' and A1*' are used to measure potentials. In addition, the central section of the array incorporates twelve azimuthal electrodes to add the directional capability. The AO electrode is split into two sections. AO and AO' are located on either side of the azimuthal array with the two monitoring electrodes A0* and A0*' added at their respective centers.

The devices disclosed in Seeman and in Smits are still susceptible to errors due to poor azimuthal focusing. One reason is that there is an offset between the azimuthal array of electrodes and the borehole wall. In the presence of a conducting mud (water based mud), focusing in the azimuthal direction becomes problematic. This results in a reduced azimuthal resolution of the resistivity measurements.

In addition to azimuthal resistivity measurements, there are many prior art devices that make so called "microresistivity" measurements. Such a device using arrays of electrodes on pads is disclosed in U.S. Pat. No. 6,348,796 to Evans et al., having the same assignee as the present invention and the contents of which are fully incorporated herein by reference. Disclosed in Evans '796 are button electrodes on a pad that makes contact with the formation or is in close proximity to the formation. Microresistivity measurements when made with an array of electrodes can provide high resolution resistivity images of the borehole wall.

Besides the laterolog type devices described above, a pad mounted azimuthal resistivity device has been discussed in U.S. Pat. No. 6,025,722 to Evans et al. The Evans '722 device uses electrodes mounted on pads. Bucking or focusing currents are provided from the body of the tool. Additional focusing may also be provided by use of additional circuitry for providing focusing from the body of the tool. The Evans '722 device does not provide a capability of providing different depths of investigation.

It would be desirable to have a method and apparatus for making azimuthal resistivity measurements of earth formations with a logging tool that addressed the problems discussed above. Such a method and apparatus should preferable be able to provide high resolution resistivity measurements. The present invention satisfies this need.

SUMMARY OF THE INVENTION

The present invention is an apparatus and method for making measurements of a parameter of interest of an earth formation. An elongated support member supports a central electrode on said elongated support member. Two pairs of monitor electrodes are provided on the support member and disposed on opposite sides of the central electrode. The elongated support member also includes a first guard electrode an extendable member mechanically coupled to said elongated member by an extension device, the extendable member on the same side of the central electrode as the first guard electrode. The extendable member includes an electrically conducting pad at the same electrical potential as an adjacent portion of the support member. An additional pair of guard electrodes may be on the support member. The additional pair of guard electrodes are on a side of the central electrode opposite to the first guard electrode and the electrically conducting pad. Optionally, several extendable members, each having its own conducting pad, may be provided. Optionally, one or more microelectrodes may be positioned on each of the conducting pads for obtaining microresistivity measurements of the earth formation.

The present invention includes a method of determining azimuthal resistivity of earth formations. One or more pad mounted sensors are arranged in a laterolog configuration. By measuring the currents in the various guard electrodes, the pad and a central electrode while monitoring the voltage difference between at least one pair of monitor electrodes, shallow and deep resistivity measurements may be obtained. In addition, a microelectrode on a pad may be used for a high resolution resistivity measurement.

BRIEF DESCRIPTION OF THE FIGURES

The application is best understood with reference to the following drawings wherein like numbers in different figures refer to like components and wherein:

FIG. 6b shows details of the pad of FIGS. 5 and 6a.

DETAILED DESCRIPTION OF THE INVENTION

Figure 1:
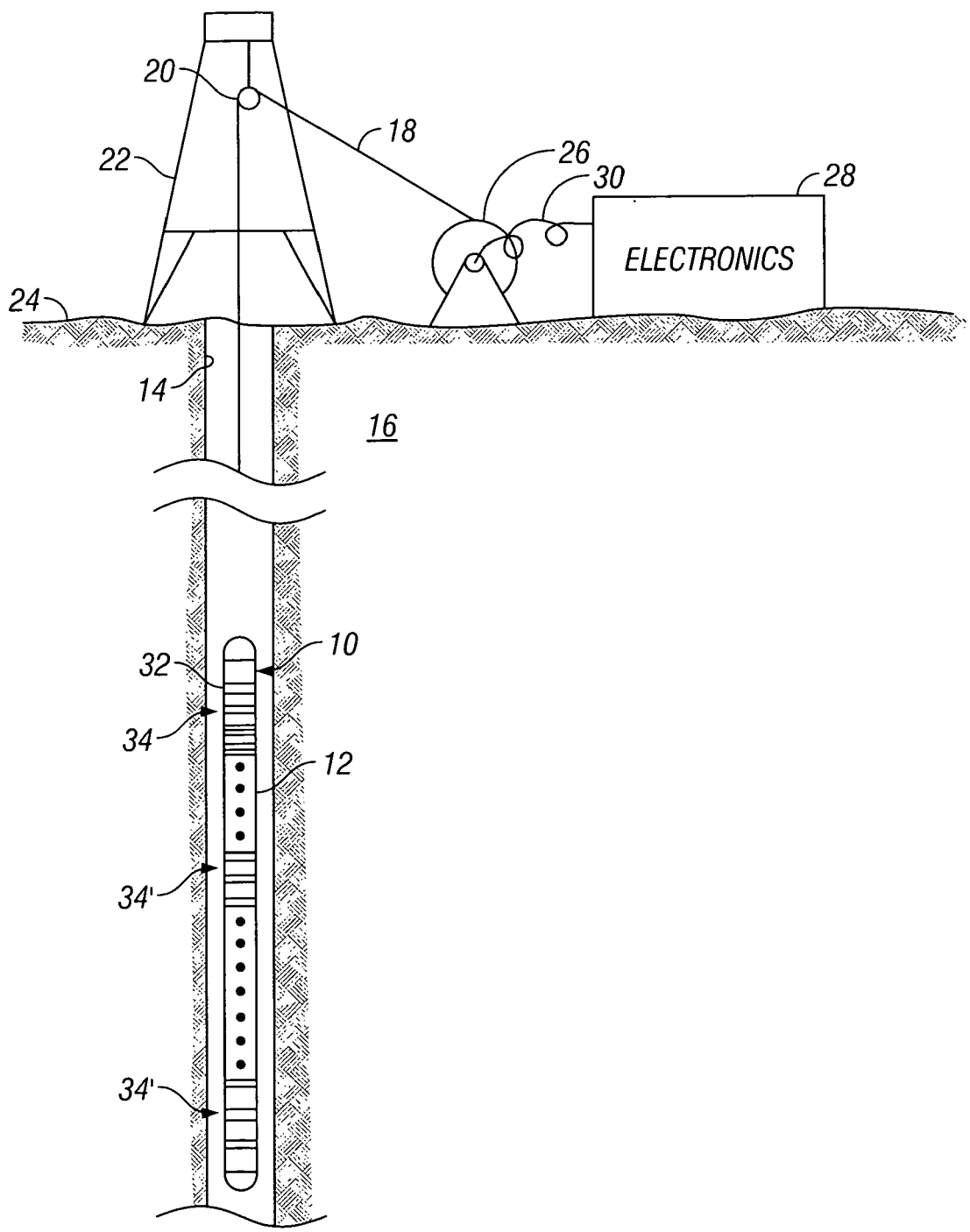
FIG. 1 (Prior art) is a diagram illustrating a wireline logging tool in a borehole.

Referring now to FIG. 1, an exemplary prior art differential array resistivity instrument 10 will be described. Such an instrument has been described in U.S. Pat. No. 6,060,885 to Tabarovsky et al. having the same assignees as the present invention and the contents of which are incorporated herein by reference. The instrument 10 is shown disposed in a borehole 14 penetrating an earth formation 16 and supported by a wire cable 18. The cable 18 is supported and guided by a sheave wheel 20 suspended from a well structure 22 in place on the earth's surface 24 over the wellbore 14. The cable 18 is stored on a cable drum 26 which is controlled at the surface to lower and raise the differential array instrument 12 within the wellbore 14 at a predetermined logging speed. Commands for controlling the operation of the instrument 12 and the data collected by the instrument are transmitted electrically through the cable 18 and via interconnecting cable 30 to an electronics package 28 located at the surface. Alternatively, a downhole processor (not shown) may be used for doing some or all of the processing downhole.

The instrument 10 has an elongated mandrel or body 12, a single source electrode 32 located near the upper end of the instrument housing, and several groups of identical measuring electrodes 34, 34' and 34" uniformly distributed along the axis of the tool mandrel, which allow for performing a number of measurements at each logging depth.

Figure 2:
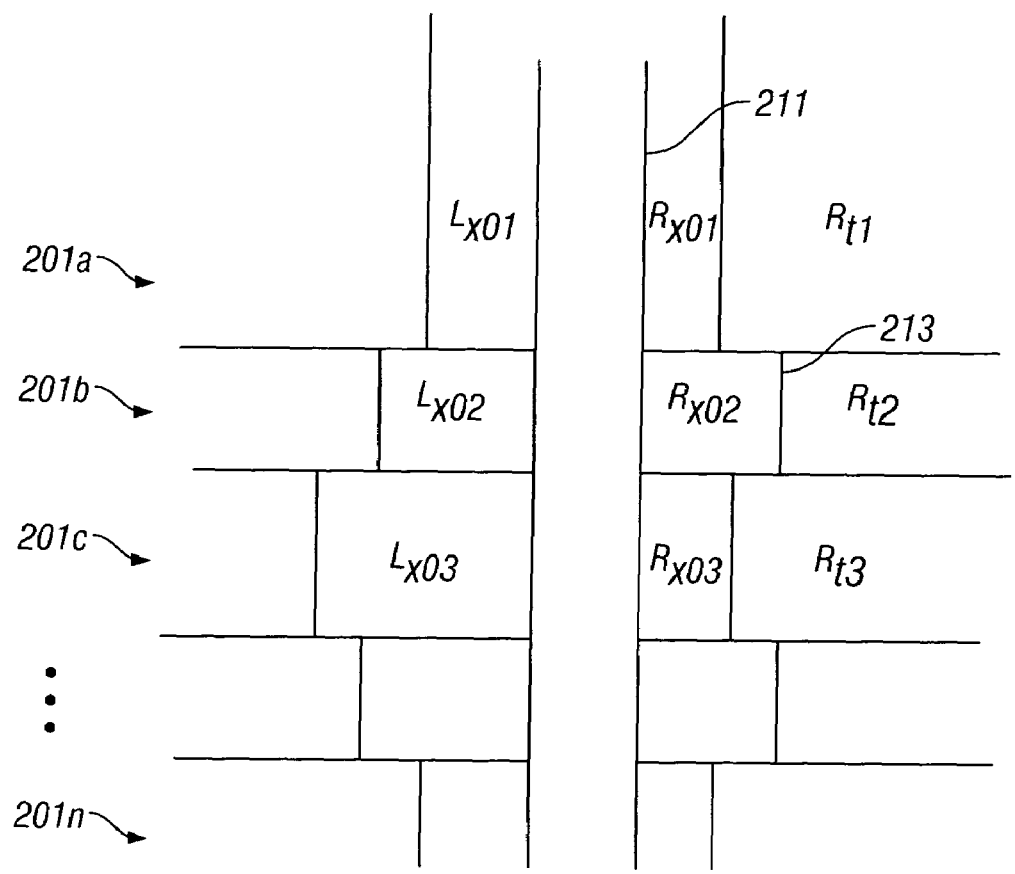
FIG. 2 is a stylized schematic diagram of an assumed earth model formation penetrated by a vertical borehole and showing various formation medium related parameters.
Figure 3:
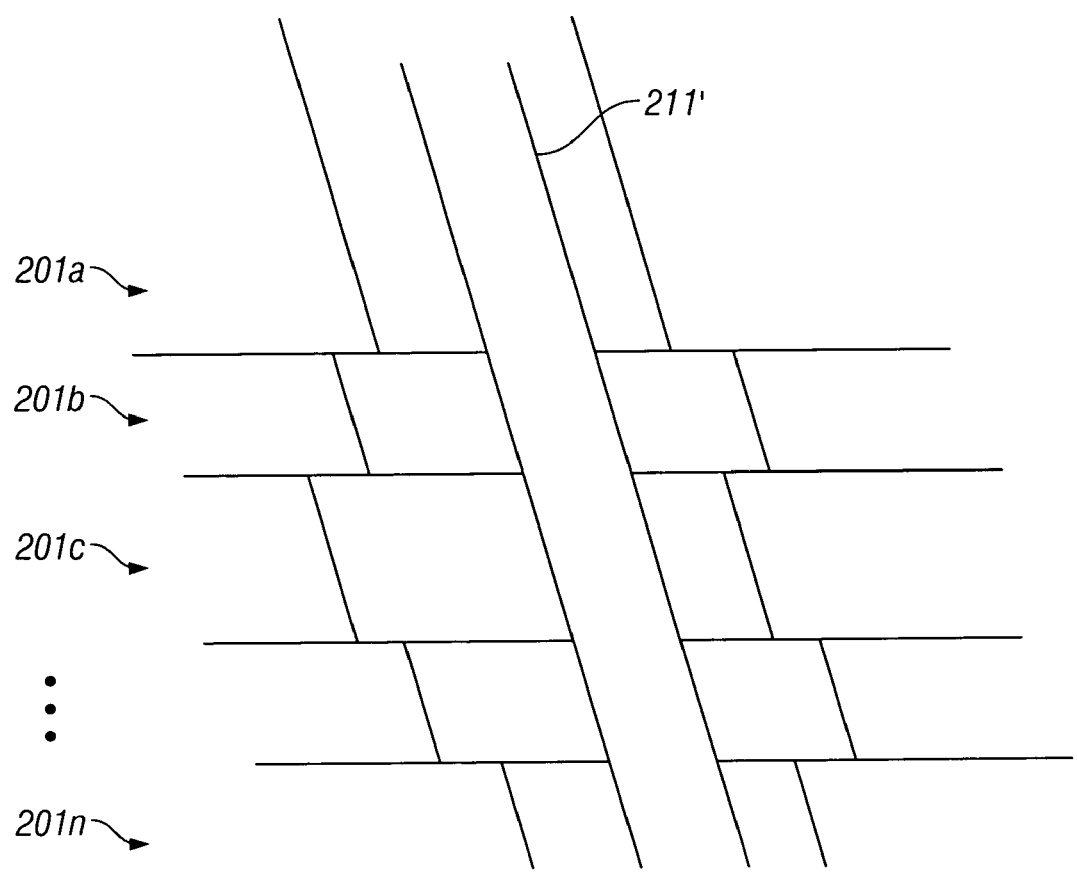
FIG. 3 depicts a deviated borehole corresponding to FIG. 2 giving rise to azimuthal variations of resistivity FIGS. 4a and 4b (prior art) illustrates the arrangement of electrodes in a preferred embodiment of the present invention.

Referring next to FIG. 2, a borehole 211 is shown with a plurality of layers in an earth formation depicted by 201a, 201b, 201c ... 201n. Each of the layers is characterized by a corresponding resistivity $R_{t1}, R_{t2}, R_{t3}, \ldots$ In addition, there is an invaded zone around the borehole that is characterized by resistivities $R_{x01}, R_{x02}, R_{x03}, \ldots$ resulting from invasion of the earth formation by mud from the borehole. In the view of FIG. 2, the invaded zones are characterized by lengths $L_{x01}, L_{x02}, L_{x03}, \ldots$ However, for the case of a deviated borehole 211' shown in FIG. 3, the apparent resistivity as seen by a resistivity sensor having a given depth of investigation will show azimuthal variations even if the depth of the invaded zone is unchanged. This azimuthal variation is due to the fact that currents, focused radially away from the borehole.pass through different amounts of zones of different resistivity as the azimuth changes. In addition, there is also the possibility that the depth of the invaded zone may also change.

As discussed in Smits, Laterologs focus the survey current emitted from the A0 electrode into the formation by means of a feedback loop that adjusts the bucking or survey current to maintain the monitoring electrodes M1 and, M2 at an equipotential. In theory this requires infinite amplifier gain but in practice this gain must be limited to guarantee stability. As a result, the monitoring electrodes are not exactly at equipotential and an error is introduced into the measurement. Although this error is small in the Dual Laterolog, it can become significant when electrode spacing is decreased to enhance tool resolution. The configuration of the Smits design has been discussed above and is not repeated here. However, for the present invention, we will adopt the terminology of Smits As noted above, it is difficult to maintain azimuthal focusing of the currents from the elements of the azimuthal electrodes due to the standoff from the borehole wall. Consequently, the measurements made by the individual electrodes may not be limited to the azimuthal sector defined by the electrodes. This can result in poorer resolution as well as overlap between measurements made by adjacent electrodes.

Figure 5:
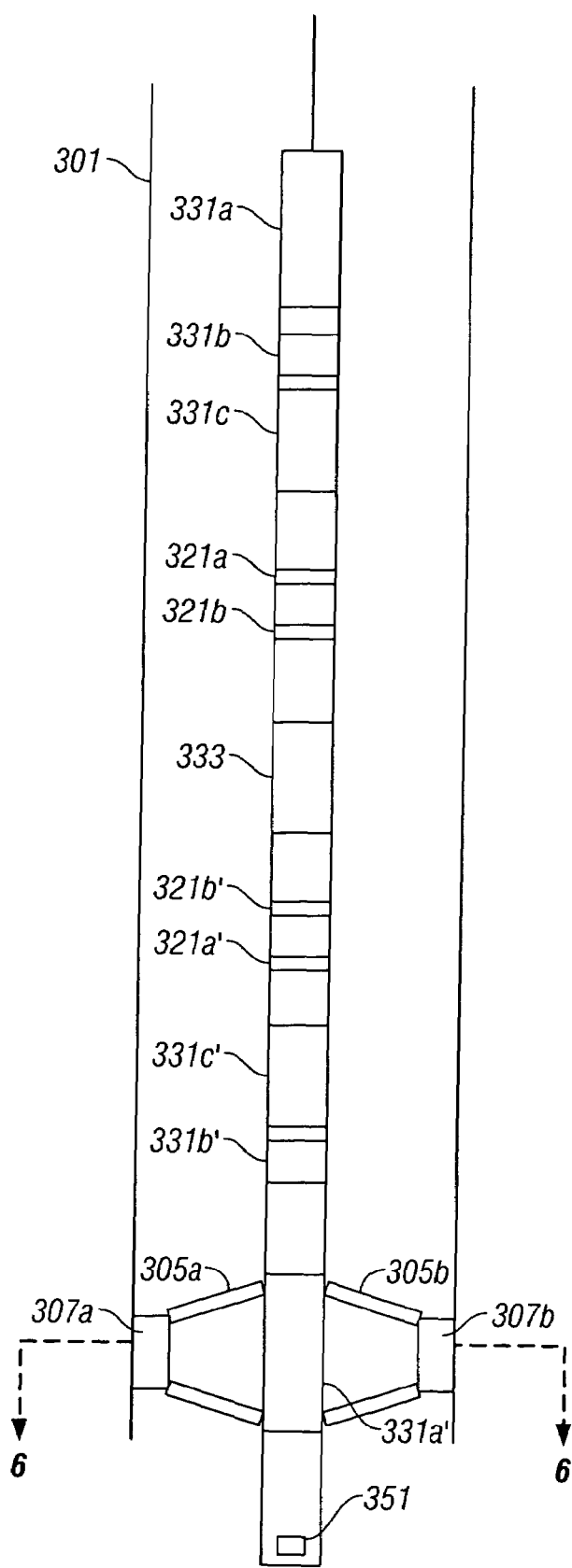
FIG. 5 is a schematic illustration of the apparatus of the present invention.

This problem is addressed in the present invention by the hardware configuration shown in FIG. 5. Shown therein is a borehole wall 301 with a tool having an elongated body therein. The central electrode 333 on the body corresponds to the electrode commonly called the A0 electrode in the Laterolog configuration. There is a pair of monitor electrodes 321a and 321b on one side of the A0 electrode, and a corresponding pair of monitor electrodes 321a' and 321b' on the other side of the A0 electrodes. These correspond to the M2, M1, M2' and M1' electrodes. Similarly, the electrodes 331c and 331c' correspond to the guard electrodes A1 and A1', while 331b and 331b' correspond to the guard electrodes A1* and A1*' electrodes in the Smits configuration. The electrodes 331a correspond to the guard electrode A2. An important point of novelty of the present invention over the arrangement in Smits A2' electrode is that the corresponding element 331a' comprises a portion on the housing of the logging tool as well as a plurality of pads 307a, 307b coupled to the housing by means of extension devices 305a, 305b. An orientation sensor 351 such as a magnetometer may provide a toolface angle of the body of the tool. within the borehole. In one embodiment of the invention, the central electrode emits a current in the range of approximately 30–35 Hz, though other freciuencies could be used.

Figure 6A:
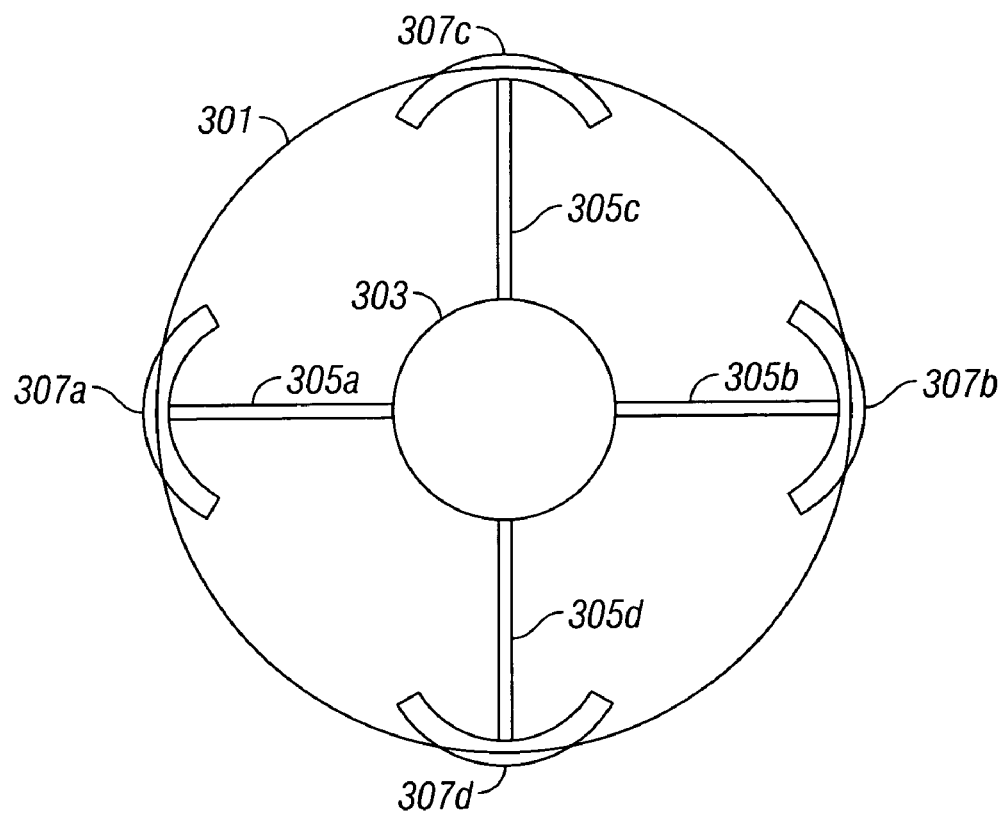
FIG. 6a is a schematic cross section of the illustration of FIG. 5.

Turning now to FIG. 6, a cross sectional view of the apparatus from FIG. 5 is shown. Depicted in FIG. 6 are four pads 307a, 307b, 307c and 307d along with corresponding extension devices 305a, 305b, 305c and 305d extending radially away from the mandrel 303. The use of four pads is not intended to be a limitation on the present invention. The number and size of pads is based upon several factors including the range of borehole sizes in which the tool would be used, and the desired resolution. Clearly, the number and size must be such that in the fully retracted position, the pads do not overlap. In the fully extended position in a large borehole, there would be gaps in coverage for a wireline tool. With small gaps, it is possible to fill in the missing information by interpolation.

Any one of several arrangements could be used for operating the extension device. Specifically, the extension device could be hydraulically operated, spring operated or electrically operated. Such devices are known in the art and are not discussed further here.

Figure 6B:
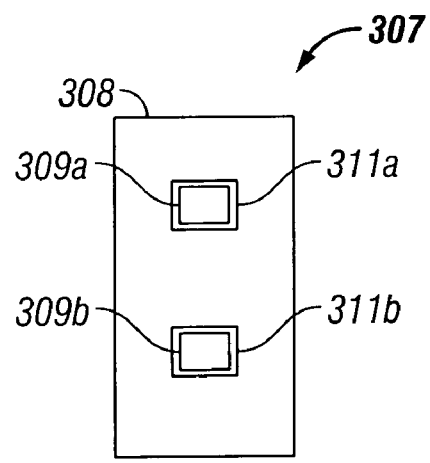

Turning now to FIG. 6b, details of one of the pads is shown. The pad 307 comprises a metallic body 308 capable of making contact with the borehole wall. Each of the pads 307a . . . 307b has independent circuitry (not shown) for measuring the current flow from the pad. In addition, each pad is also provided with a plurality of electrodes 309a, 309b that are electrically insulated from the body 308 by insulators 311a, 311b. For purposes of simplifying the illustration, only two such electrodes are shown, though more could be used. The operation of the tool is discussed next.

In one aspect of the invention, the current through the electrodes 309a, 309b is measured individually. When this is done, the device acts like a microresistivity device. In this respect, the operation of the tool is similar to that of the tool described in the Evans '796 patent, the difference being that in Evans '796, the number of electrodes on a single pad is greater than in the present invention. The reason for the difference is that the Evans '796 device is primarily directed towards obtaining a resistivity image of the formation with high resolution. Having a sufficient number of electrodes to obtain a high resolution image would detract from the other use of the present invention, which is to function like an azimuthal laterolog. The electrodes 309a and 309b (and their counterparts on the other pads) in the present invention provide the ability to measure shallow resistivity (e.g, Rx0) identify bed boundaries in the earth formation, and to some extent, determine dip of beds, but the azimuthal separation is too large to provide an accurate resistivity image.

In another aspect of the invention, the device of FIG. 5 acts like a focused resistivity device (laterolog). In this mode, the voltage between the electrodes 321a and 321b are maintained to be substantially equal, and the current from the electrode 333 is indicative of the formation resistivity.

In yet another aspect of the invention, the device of FIG. 5 acts as a focused azimuthal resistivity device. In this mode, the voltage between the electrodes 321a' and 321b' is maintained to be substantially equal. The current from a particular one of the pads, such as 307a, is then indicative of the resistivity corresponding to the azimuth of the pad 307a.

In yet another aspect of the invention, the device of FIG. 5 acts like a focused resistivity device with different depths of investigation. This may be done in an azimuthal mode. The different depths of investigation are obtained by suitable processing.

The method for obtaining different depths of investigation makes use of the principle of superposition. A description of this is found in the Smits reference and is reproduced here. The Smits device (and one embodiment of the present invention) uses a different approach through computation of the focused survey current by superposition of two independent unfocused measurements. By a suitable combination of the measurements, the monitoring voltage is canceled, thus satisfying the focusing condition. The approach has the added flexibility of being able to provide different focusing conditions with the same hardware. The method makes use of the principle of superposition from electromagnetic theory.

With the tool configuration of FIG. 5, when currents are measured from a single selected pad, the resistivity that is obtained corresponds to the azimuthal sector defined by the selected pad. When shallow and deep resistivity measurements are made from a plurality of pads, apparent shallow and deep resistivities are obtained by azimuthal sector. From these measurements, it is possible, using known methods of inversion, to determine the resistivity parameters for the model denoted by FIG. 3. U.S. Pat. No. 6,060,866 to Tabarovsky discloses a method for determining the distribution of resistivity of earth formations surrounding a wellbore. For an isotropic model, it is also possible to determine a relative dip angle and a strike direction.

The device disclosed in the Evans '722 patent has some superficial similarities to the apparatus of the present invention. Differences are pointed out here. First, the Evans '722 patent discloses electrodes similar the portion A0, M1', M2', A1', A1*', and A2 of the invention, but the objective is different: in Evans '722, the current in A2 is maintained perpendicular to the instrument while in the present invention the A0 current is maintained perpendicular to the instrument. In addition, the Evans '722 does not teach making of measurements at different depths of investigation. Another difference between the method of the Evans '722 patent and the present invention is that in the former, the measure current from only the center electrode A0 is used, whereas in the latter, currents from both the center electrode and the guard electrode are used.

In the present invention, for making shallow readings, frequencies of the order of 300 Hz are used while for the deep readings, frequencies of around 30 Hz are used. The microresistivity measurements are made with frequencies typically in the range of 500 Hz to 50 kHz. The microresistivity measurements are particularly useful in obtaining shallow resistivity of the formation and high resolution estimates of bed boundaries.

In order to determine the orientation of the extendable members and pads, suitable orientation sensors such as magnetometers (not shown) may be provided on the body of the instrument. The magnetometers provide measurements of the tool relative to magnetic north. When combined using known methods with survey information of the borehole inclination and azimuth, these magnetometer measurements provide an indication of the toolface orientation of the logging tool within the borehole.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for making measurements of a parameter of interest of an earth formation comprising:
   (a) an elongated body;
   (b) a first guard electrode on the body;
   (c) a central electrode on the body;
   (d) two pairs of monitor electrodes on the body, one of the two pairs of monitor electrodes on a first side of the central electrode, and a second of the two pairs of monitor electrodes on a second side opposite the first side of the central electrode, and
   (e) a second guard electrode including at least one electrically conducting pad mechanically coupled to an adjacent portion of the elongated body by an extension device, the at least one electrically conducting pad at substantially the same electrical potential as the adjacent portion of the body, and wherein the second guard electrode is on the same side of the central electrode as the first guard electrode.

2. The apparatus of claim 1 further comprising an additional pair of guard electrodes on said elongated body, said additional pair of guard electrodes disposed on a side of said central electrode opposite to said first and second guard electrodes.

3. The apparatus of claim 1 wherein the at least one extension device further comprises a plurality of extension devices each having an associated electrically conducting pad.

4. The apparatus of claim 3 wherein the plurality of electrically conducting pads are disposed circumferentially about the elongated body.

5. The apparatus of claim 1 wherein the at least one extension device further comprises at least one microelectrode in an interior location of and electrically insulated from the conducting pad.

6. The apparatus of claim 5 wherein said at least one microelectrode comprises a plurality of microelectrodes.

7. The apparatus of claim 1 further comprising a processor which determines from voltages of the monitor electrodes, a measurement of current from the central electrode, and measurement of currents from the first guard electrode and the pad a parameter of interest of the earth formation.

8. The apparatus of claim 7 wherein said parameter of interest is at least one of:
   (A) a resistivity of a layer of said earth formation, and
   (B) a resistivity of an invaded zone of said earth formation.

9. The apparatus of claim 1 wherein said extension device is one of (i) hydraulically operated, (ii) spring operated, and, (iii) electrically operated.

10. The apparatus of claim 1 further comprising an orientation sensor which obtains a measurement indicative of a toolface angle of the body within said borehole.

11. The apparatus of claim 1 wherein said central electrode conveys an electrical current into said earth formation at a frequency of about 30–35 Hz.

12. The apparatus of claim 5 wherein said at least one microelectrode conveys an electrical current into said earth formation at a frequency of about 500 Hz to 50 kHz.

13. A method of making measurements of a parameter of interest of an earth formation comprising:
   (a) conveying a logging tool including body into a borehole in said earth formation;
   (b) emitting a first current from a first guard electrode on the body;
   (c) emitting a measure current into the earth formation using a central electrode on the body;
   (d) monitoring voltages of a first pair of monitor electrodes on the body, the first pair of monitor electrodes on a first side of the central electrode;
   (e) monitoring voltages of a second pair of monitor electrodes on the body, the second pair of monitor electrodes on a second side of the central electrode;
   (f) emitting a second current from an electrically conducting pad mechanically coupled to the body by an extension device, the electrically conducting pad and the adjacent portion of the body forming part of a second guard electrode; and
   (g) controlling emission of currents from the first guard electrode and the electrically conducting pad in response to the monitored voltages.

14. The method of claim 13 further comprising using an additional pair of guard electrodes on body for emitting focusing currents into said earth formation, the additional pair of guard electrodes disposed on a side of the central electrode opposite to the first guard electrode.

15. The method of claim 13 further comprising using an additional pair of guard electrodes on the body for emitting focusing currents into the earth formation, the additional pair of guard electrodes disposed on the same side of the central electrode as the first guard electrode.

16. The method of claim 13 further comprising maintaining at least one of said pairs of monitor electrodes at substantially the same potential.

17. The method of claim 13 wherein said at least one electrically conducting pad comprises at least four electrically conducting pads.

18. The method of claim 17 further comprising disposing said at least four electrically conducting pads circumferentially about said elongated body.

19. The method of claim 13 further comprising using at least one microelectrode on said at least one extendable member in an interior location of and electrically insulated from said conducting pad for obtaining a microresistivity measurement of said earth formation.

20. The method of claim 19 further comprising using a plurality of microelectrodes.

21. The method of claim 13 further comprising determining from voltages of said monitor electrodes, a measurement of current from the central electrode, and measurement of currents from said first guard electrode and said pad a parameter of interest of said earth formation.

22. The method of claim 21 wherein said parameter of interest is at least one of:
   (A) a resistivity of a layer of said earth formation,
   (B) a resistivity of an invaded zone of said earth formation, and
   (C) a thickness of a layer of said earth formation.

23. The method of claim 13 further comprising using an orientation sensor for obtaining a measurement indicative of a toolface orientation of the apparatus within said borehole.

24. The method of claim 13 further comprising using said central electrode for conveying an electrical current into said earth formation at a frequency of about 30–35 Hz.

25. The method of claim 19 further comprising operating said at least one microelectrode at a frequency of about 500 Hz to 50 kHz.

26. The method of claim 23 wherein said orientation sensor comprises a magnetometer.

* * * * *